(12) United States Patent
Bragin et al.

(10) Patent No.: US 7,079,565 B2
(45) Date of Patent: Jul. 18, 2006

(54) SYSTEMS AND METHODS UTILIZING LASER DISCHARGE ELECTRODES WITH CERAMIC SPOILERS

(75) Inventors: Igor Bragin, Goettingen (DE); Vadim Berger, Goettingen (DE); Oleg Melnikov, Goettingen (DE); Konstantin Aab, Kassel (DE); Juergen Baumler, Osterode (DE)

(73) Assignee: Lambda Physik AG, Goettingen (DE)

( * ) Notice: Subject to any disclaimer, the term of this patent is extended or adjusted under 35 U.S.C. 154(b) by 301 days.

(21) Appl. No.: 10/727,718

(22) Filed: Dec. 4, 2003

(65) Prior Publication Data

US 2004/0131100 A1    Jul. 8, 2004

Related U.S. Application Data

(60) Provisional application No. 60/435,879, filed on Dec. 20, 2002.

(51) Int. Cl.
 *H01S 3/097* (2006.01)
(52) U.S. Cl. ...................................... 372/87
(58) Field of Classification Search .................. 372/87
See application file for complete search history.

(56) References Cited

U.S. PATENT DOCUMENTS

| 3,921,097 | A | * | 11/1975 | Caristi et al. ................. 372/83 |
| 4,122,411 | A | * | 10/1978 | Fein et al. ..................... 372/87 |
| 4,257,012 | A | * | 3/1981 | Malburg et al. ............... 372/90 |
| 4,495,631 | A | * | 1/1985 | Lacour et al. ............ 372/38.05 |
| 5,142,547 | A | * | 8/1992 | Cirkel et al. .................. 372/86 |
| 5,247,534 | A | * | 9/1993 | Muller-Horsche ............ 372/58 |
| 5,347,532 | A |   | 9/1994 | Rebhan et al. ................ 372/87 |
| 5,957,017 | A | * | 9/1999 | Andronica .................... 82/150 |
| 6,414,978 | B1 |   | 7/2002 | Bragin et al. ................. 372/58 |
| 6,466,599 | B1 |   | 10/2002 | Bragin et al. ................. 372/58 |
| 6,466,602 | B1 | * | 10/2002 | Fleurov et al. ............... 372/87 |
| RE38,054 | E | * | 4/2003 | Hofmann et al. ............. 372/25 |
| 6,546,036 | B1 |   | 4/2003 | Bragin et al. ................. 372/57 |
| 6,556,609 | B1 |   | 4/2003 | Bragin et al. ................. 372/57 |
| 6,577,663 | B1 |   | 6/2003 | Vogler .......................... 372/57 |
| 2002/0001329 | A1 | * | 1/2002 | Kojima ......................... 372/55 |

OTHER PUBLICATIONS

"Precision Bulletin", The Barden Corporation, Feb. 21, 2000.*
U.S. Appl. No. 09/823,298, filed Mar. 29, 2001, by Juergen Baumler, entitled "Narrow Bandwidth Oscillator-Amplifier System," 45 pages in length.

* cited by examiner

*Primary Examiner*—Minsun Oh Harvey
*Assistant Examiner*—Tod T. Van Roy
(74) *Attorney, Agent, or Firm*—Stallman & Pollock LLP

(57) ABSTRACT

Arcing can be minimized in a discharge chamber of an excimer or molecular fluorine laser system by utilizing an improved electrode structure. An electrode structure can include at least one ceramic spoiler positioned near the discharge region of the electrode. An insulating ceramic spoiler can reduce the effective area over which arcing can occur, and can reduce the likelihood of arcing by improving the flow of gas between the electrodes, such as by allowing for design flexibility and reducing the necessary height of a nose portion used to control the discharge area of the electrode. An improved blower design, which can utilize improved bearings and a dry film lubricant, can help to circulate the laser gas between the electrode structures, such as at a speed of at least 30 m/s in order to operate the laser at repetition rates of 4 kHz or higher.

19 Claims, 7 Drawing Sheets

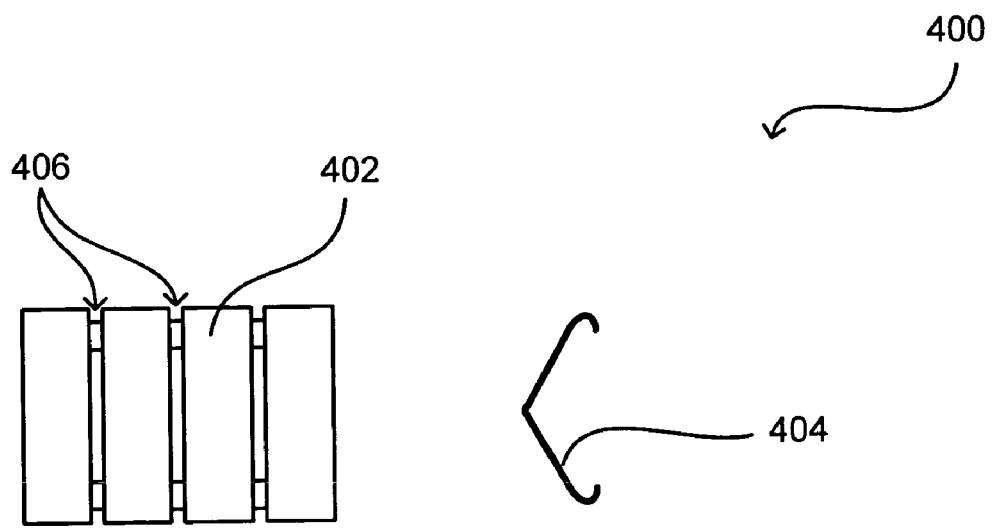
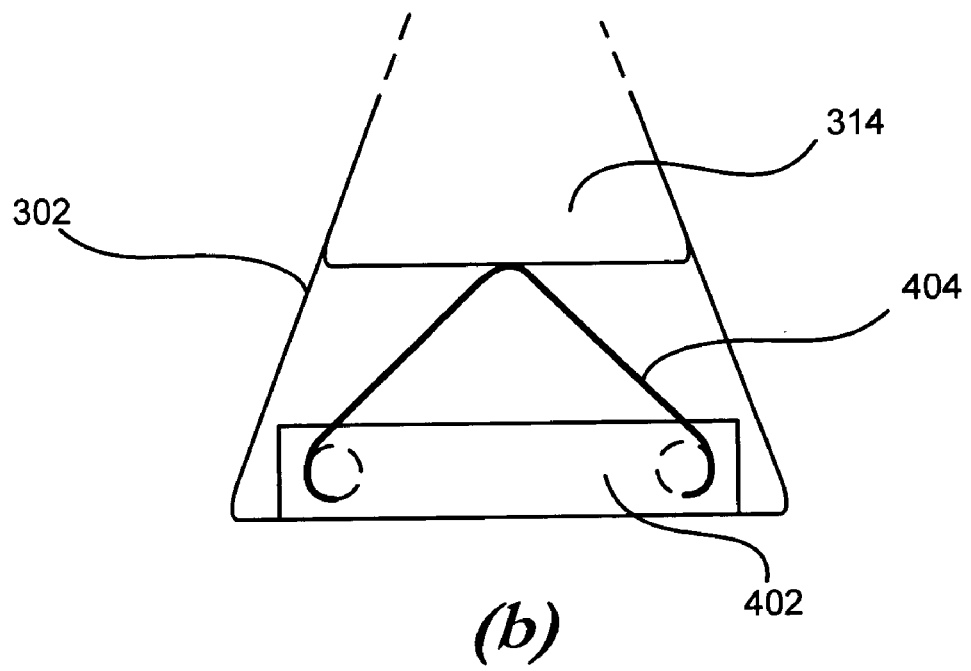
*Figure 4*

*Table 1* (Data of Dicronite Dry Lube)

| SPECIFIC TECHNICAL DATA | |
|---|---|
| COMPOSITION | modified Tungsten Disulfide, lamellar form |
| HARDNESS | takes on the hardness of the substrate |
| MOLECULAR WEIGHT | 248.02 |
| DENSITY | 7.4 grms/cc |
| THICKNESS | 0.000020 inch |
| APPEARANCE | on initial application-silvergray, then polished rhodium when burnished |
| CO-EFFICIENT OF FRICTION | inclined plane technique-0.03 |
| CARRIER | dry air, no binders or adhesives |
| ADHESION | mechanical-molecular interlock |
| CURE TIME | no cure time required, applied at ambient temperature |
| TEMPERATURE RANGE | lubricates from -350 f to +1000 f (-188 c to 538 c) in normal atmosphere |
| CHEMICAL STABILITY | inert, non-toxic, corrosion resistant |
| CORROSION RESISTANCE | minor delay of corrosion, will not inhibit corrosion of substrate |
| MAGNETISM | non-magnetic |
| VACUUM ENVIRONMENT | 350 f to +2400 f (-188 c to +1316 c) in temperatures of 10-14 Torr |
| SUBSTRATE | all solid metals, glass, fiberglass, porcelain, most plastics, and man-made solids |
| LOAD CAPACITY | same as the substrate, to 350,000 PSI |
| LOX COMPATIBILITY | insensitive to detonation by or in the presence of oxygen |
| DEGRADATION | will not cause distortive stress relief, additional stress, or degradation to substrate |

*Figure 6*

SYSTEMS AND METHODS UTILIZING LASER DISCHARGE ELECTRODES WITH CERAMIC SPOILERS

CLAIM OF PRIORITY

This patent application claims the benefit of priority to U.S. Provisional Patent Application No. 60/435,879, entitled "ELECTRODE WITH CERAMIC SPOILER," to Igor Bragin et al., filed Dec. 20, 2002.

CROSS-REFERENCE TO RELATED APPLICATIONS

The following U.S. patents and patent applications are hereby incorporated herein by reference:

U.S. Patent Provisional Application No. 60/193,048, entitled "BLOWER FOR GAS LASER," to Juergen Baumler, filed Mar. 29, 2000, and related U.S. patent application Ser. No. 09/823,298 filed Mar. 29, 2001;

U.S. Pat. No. 6,577,663, entitled "NARROW BANDWIDTH OSCILLATOR-AMPLIFIER SYSTEM," to Klaus Vogler, filed Aug. 6, 2001; and U.S. Pat. No. 6,556,609, entitled "DISCHARGE UNIT FOR A HIGH REPETITION RATE EXCIMER OR MOLECULAR FLUORINE LASER," to Igor Bragin et al., filed Apr. 3, 2001.

BACKGROUND

Line-narrowed and line-selected excimer and molecular fluorine lasers can be used advantageously in industrial applications such as optical microlithography for forming small electronic structures on silicon substrates. Photoablation and micromachining applications require these lasers to be run at medium to high power, while maintaining a necessarily high repetition rate. Problems exist for such high repetition rate laser systems, however, as there is an unacceptable risk of arcing in the discharge chamber. Several approaches have been taken to improve the arrangement and composition of components in such a system, but none have proven to provide acceptable performance with an ease of use and at a reasonable cost.

FIELD OF THE INVENTION

The present invention relates to the prevention of arcing between components in a gas discharge laser, particularly an excimer or molecular fluorine laser.

BRIEF DESCRIPTION OF THE DRAWINGS

FIG. 4 is a diagram of a snap-on mounting that can be used with the electrode of FIG. 2.

FIG. 6 is a table showing properties of a dry lubricant that can be used in accordance with one embodiment of the present invention.

DETAILED DESCRIPTION

Figure 1:
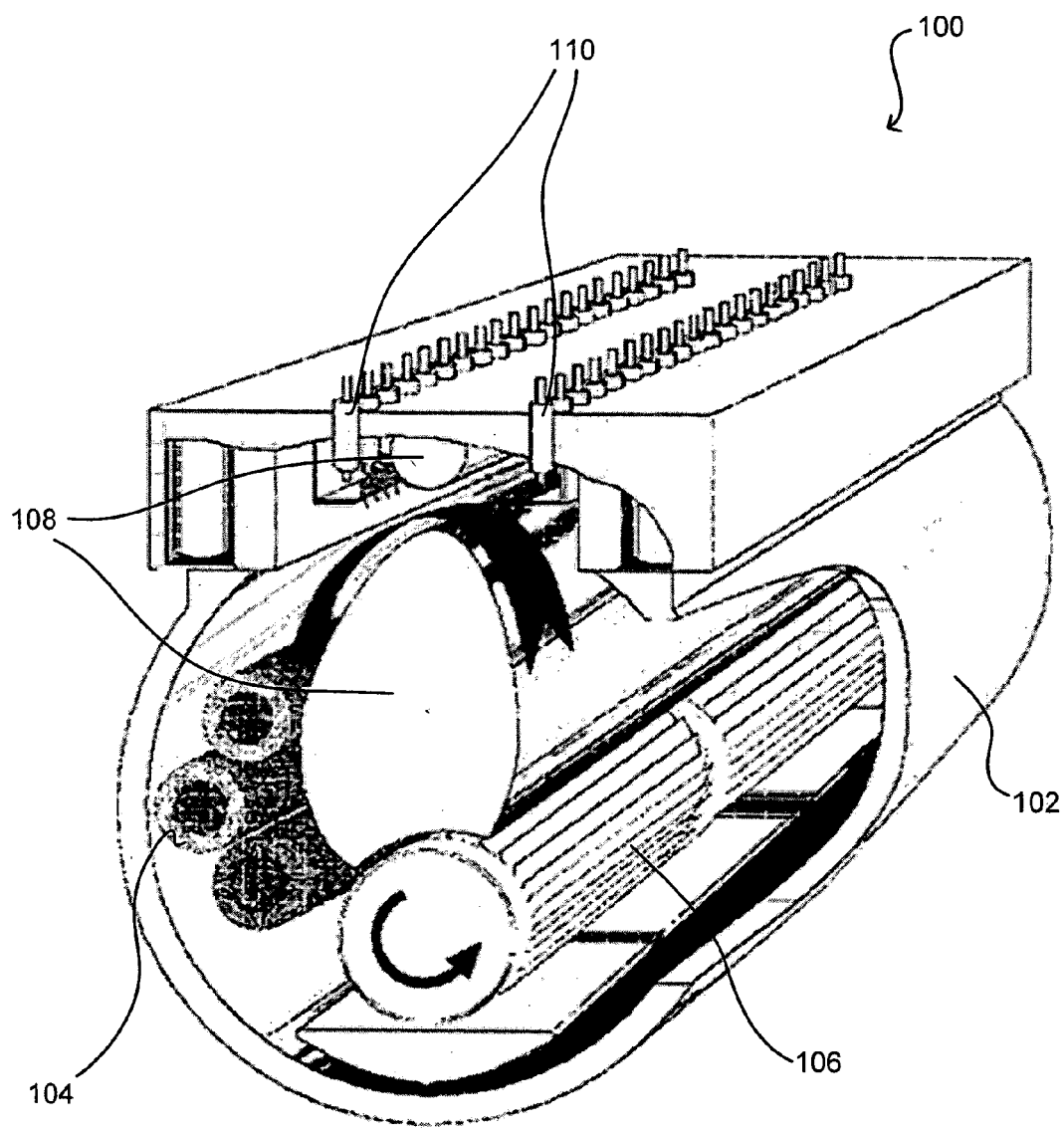
FIG. 1 is a perspective view of a laser discharge chamber that can be used in accordance with various embodiments of the present invention.

FIG. 1 shows a perspective, cut-away view of a excimer or molecular fluorine laser discharge chamber 100 that can be used in accordance with various embodiments of the present invention. An excimer or molecular fluorine laser system can be a deep ultraviolet (DUV) or vacuum ultraviolet (VUV) laser system, such as a KrF, ArF, molecular fluorine ($F_2$) laser system, for use with a DUV or VUV lithography system. Alternative configurations for laser systems for use in such other industrial applications as TFT annealing, photo-ablation, and micromachining, include configurations understood by those skilled in the art as being similar to, and/or modified from, the system shown in FIG. 1 to meet the requirements of that application. The laser can utilize two or more gases, such as a halogen and one or two rare gases. KrF (248 nm) excimer lasers typically have gas mixtures of krypton, fluorine, and a buffer gas of neon. ArF (193 nm) excimer lasers typically have gas mixtures of argon, fluorine, and a buffer gas of neon, helium, and/or xenon. The molecular fluorine ($F_2$) laser has a gas mixture of fluorine and one or more buffer gases, and emits at least two lines around 157 nm, one of which can be selected, and narrowed, such that a very narrow linewidth VUV beam can be realized.

The exemplary discharge chamber 100 of FIG. 1 comprises a laser chamber 102, or laser tube, having disposed therein a heat exchanger 104 and fan 106 for circulating a temperature-controlled gas mixture within the chamber 100. The laser tube includes a pair of main discharge electrodes 108, where the upper electrode is an anode and the lower electrode is a cathode, the electrodes being capable of energizing a gas mixture in the discharge chamber. The electrodes 108 can be connected to an external solid-state pulser module capable of providing a discharge pulse to the electrodes. A pulser module, or pulse power system, can provide electrical pulses of 4 kHz or more. An external gas handling module can have a valve connection to the laser tube such that a gas mixture can be injected or filled into the chamber. The gas mixture can include any appropriate gas, such as a mixture including halogen, any active rare gases, at least one buffer gas, and possibly a gas additive. The total gas mixture pressure can be lower than in conventional systems, such as less than 3 bar, in order to produce the selected line at a narrow bandwidth, such as on the order of 0.5 pm or less, without using additional line-narrowing optics The laser chamber 102 can include one or more pre-ionization units (not shown), which can utilize a number of pre-ionization pins 110 positioned on either side of the main discharge electrodes 108. Preionization units used with various embodiments can include sliding surface or coronatype preionization units. A solid-state or thyratron pulser module in combination with a high voltage power supply can transmit electrical energy in compressed electrical pulses to the preionization pins 110 and main electrodes 108 within the laser tube 102 in order to energize the gas mixture.

The discharge chamber 100 can have front and rear optics modules (not shown) positioned at ends of the chamber, in order to form a resonator of the chamber. The laser chamber 102 also can be sealed by windows that are transparent to the wavelengths of the emitted laser radiation. While one of the windows can output couple the beam, the other window can act as a highly reflective resonator reflector on the opposite side of the chamber 102 as the beam is outcoupled.

Figure 5:
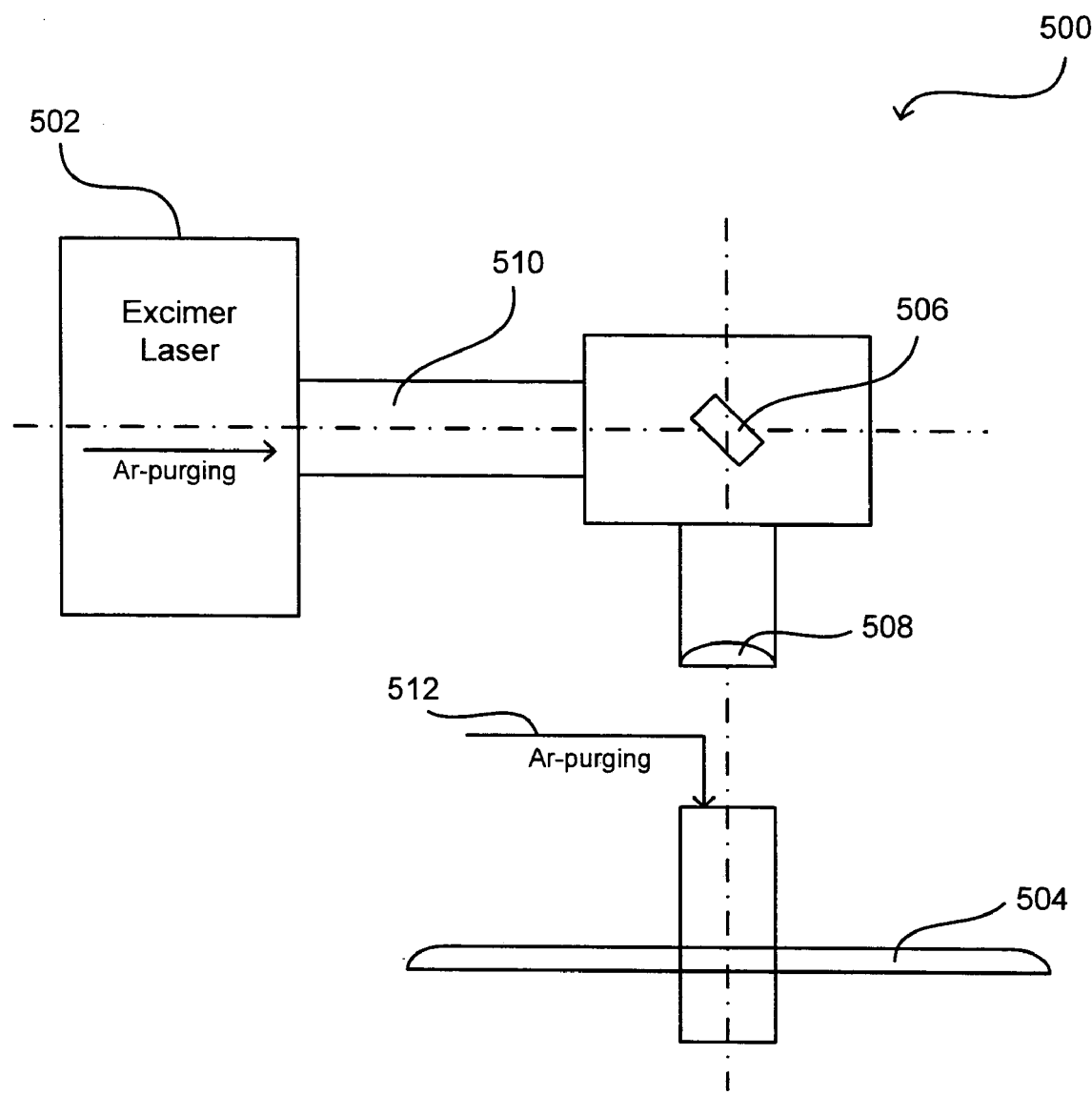
FIG. 5 is a diagram of a system that can be used to clean the electrode body of FIG. 2.

Particularly for the molecular fluorine laser system, and also for the ArF and KrF laser systems, an enclosure (such as is shown in FIG. 5) can be used to seal the beam path of the laser system, in order to keep the beam path free of photoabsorbing or other contaminant species that can attenuate and/or otherwise disturb the beam. Smaller enclosures can seal the beam path between the chamber and the optics modules (not shown). The optics modules can be maintained in an atmosphere that is sufficiently evacuated, or can have an inert gas-purged atmosphere.

Total pressure adjustments in the form of releases of gases or reduction of the total pressure within the laser tube 102 also can be performed. Total pressure adjustments can be followed by gas composition adjustments if, for example, it is necessary to adjust the desired partial pressure of halogen gas in the laser tube after a total pressure adjustment. Total pressure adjustments also can be performed after gas replenishment actions, and can be performed in combination with smaller adjustments of the driving voltage to the discharge than could be made if no pressure adjustments were performed in combination.

Figure 2:
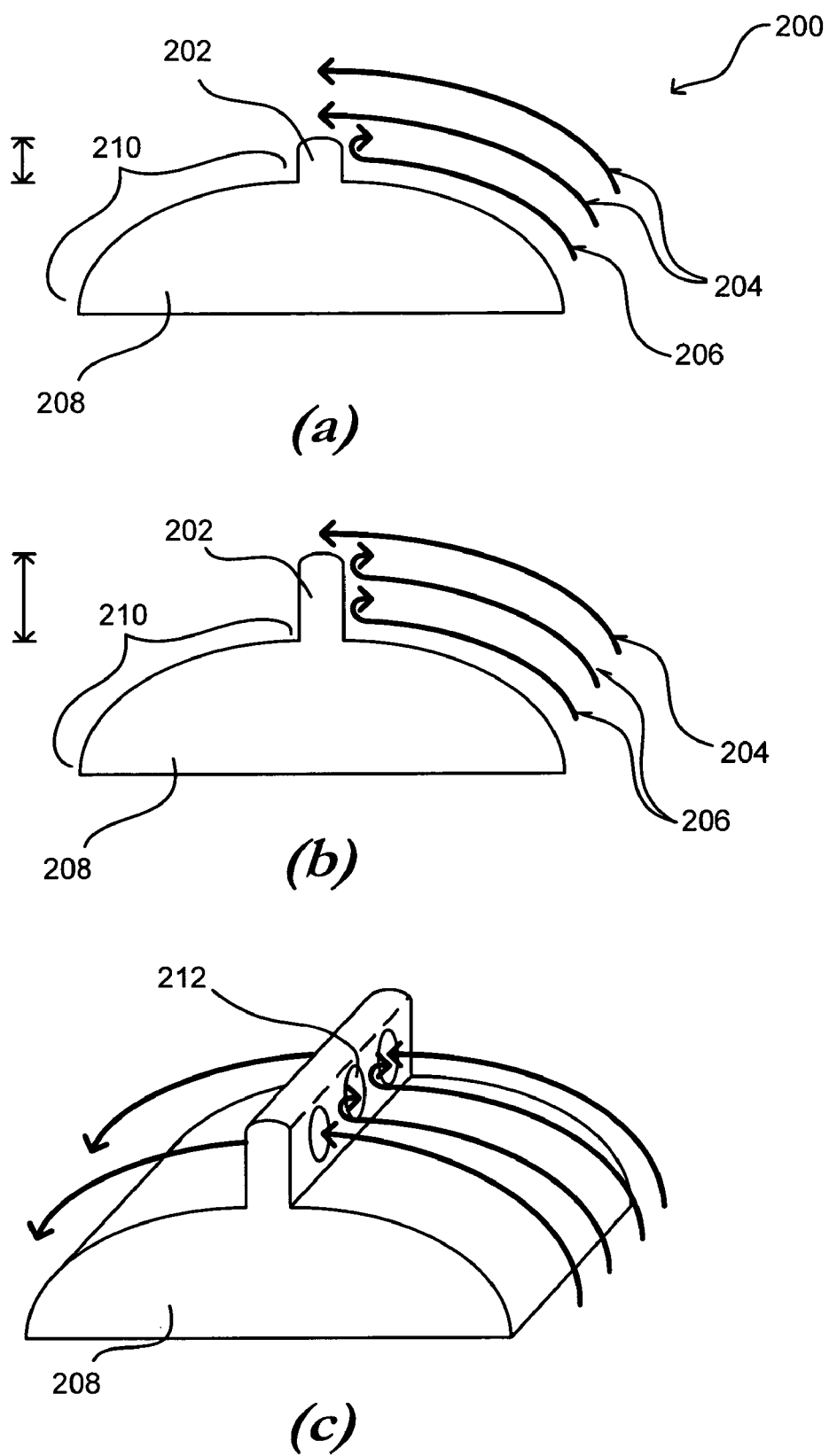
FIGS. 2(a)–(c) are diagrams showing gas flow about an electrode that can be used with the chamber of FIG. 1.

Systems and methods in accordance with embodiments of the present invention can overcome deficiencies in existing gas discharge laser systems by taking one of a number of novel approaches to the problem of arcing. For example, FIG. 2 shows a cross-sectional view of an electrode structure 200 that can be used in accordance with one embodiment of the present invention. The body 208 of the electrode structure can be fashioned of any appropriate electrode material known or used in the art, such as for example brass, or any other metal or appropriate conductive material. A brass electrode as such can be used with lasers in the 1–4 kHz range, as well as with high repetition rate lasers of 6 kHz and higher. The electrode body 208 is shown to have a protruding "nose" portion 202. A protruding nose portion can be used to maintain the appropriate gap distance between the cathode and anode electrodes, in order to properly energize the gas mixture. Electrode nose portions are described, for example, in U.S. Pat. No. 6,556,609 entitled "DISCHARGE UNIT FOR A HIGH REPETITION RATE EXCIMER OR MOLECULAR FLUORINE LASER," incorporated herein by reference above. The use of a nose portion, however, effectively separates the bulk of the electrode bodies 208 from each other, as well as from the pre-ionization pins (shown in FIG. 1). This separation can help to prevent arcing between, for example, shoulder portions 210 of the electrodes and the pre-ionization pins. This nose portion can run the entire length of the electrode body, or a portion of the electrode length, and can be on the order of 1–4 mm in width in one embodiment, and 2–4 mm in height, such as may be useful with 1–6 kHz lasers. For lasers with repetition rates of 6 kHz or higher, the width of the nose can be on the order of 1 mm or lower, with a height on the order of about 2 mm. For lasers of 6 kHz and higher, the gap between the anode and the cathode electrodes can be reduced from about 16 mm to about 12 mm, in order to reach a stable discharge with well defined laser parameters. Arcing between the shoulder portions 210 of the electrodes, as well as from the preionization pins to the electrode shoulders, can occur during high repetition rate operation.

In an attempt to further avoid arcing effects, the nose portion 202 of an electrode 200 can be increased in height, such as is shown schematically in FIG. 2(b). A longer nose portion can function to increase the distance between the electrodes and peripheral shoulder areas, as well as the distance between the electrodes and the preionization unit (shown in FIG. 1). A longer nose portion 202, however, can have a strong influence on the flows 204, 206 of gas between the electrodes. An optimized gas flow with higher gas speeds, such as on the order of about 30–50 m/s, can be necessary for a high repetition rate laser over 4 kHz. While a first portion of the gas flow 204 may not be greatly affected by the nose portion, a relatively long nose portion can function as a gas barrier to other portions 206 of the gas flow. The presence of a gas barrier not only reduces the amount of flow between the electrodes, but also can function to create turbulences in the gas flow. As can be seen schematically in FIGS. 2(a) and (b), the amount of turbulence created in the gas flow can be directly related to the height of the nose portion 202. The gas flow between electrodes can be improved by placing a number of holes 212 or openings in the nose portion, such as is shown in FIG. 2(c), through which the laser gas can flow. These holes do not provide for sufficient flow in most applications, however, and still allow for some degree of turbulence.

Figure 3:
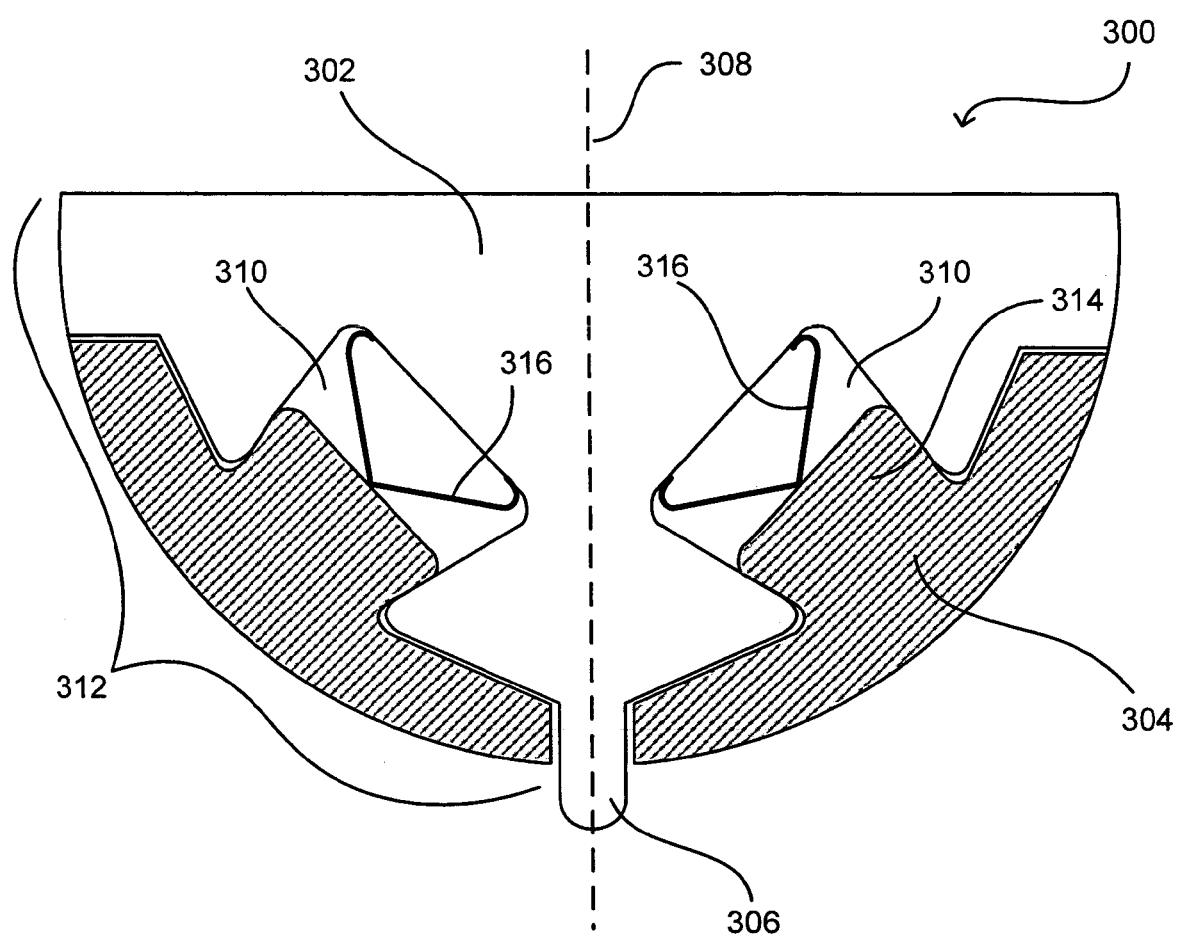
FIG. 3 is a cross-sectional view of an electrode having ceramic spoilers that can be used with the chamber of FIG. 1.

An improved approach that can be used to avoid arcing, while improving the gas flow between the electrodes, is shown the exemplary electrode structure 300 of FIG. 3. In a laser discharge chamber such as that shown in FIG. 1, the cathode and anode electrodes each can utilize at least one ceramic spoiler 304. A ceramic spoiler can be placed at each shoulder region 312 of the electrodes, to act as an insulating barrier over the body 302 of the electrode. This insulating barrier can prevent arcing from the body or shoulder regions of the electrode, while leaving the nose portion exposed in order to energize a laser gas mixture in the discharge chamber. Each spoiler can be made of a ceramic material, such as alumina, that is capable of resisting the aggressive gases contained in a laser gas mixture. The spoiler can cover any appropriate amount of the shoulder region 312, such as on the order of about 20% to about 99%. If less than about 99% of the shoulder region is covered by a spoiler, the portion containing the spoiler can be positioned relative to the shoulder at a position that will most reduce the probability of arcing. For example, if arcing occurs primarily between the upper and lower electrodes, then the spoiler might be positioned near the nose of each electrode. If, however, the arcing occurs primarily between opposing electrodes and a pre-ionization unit, for example, the spoilers might advantageously be placed away from the nose of the electrode and closer to the location of the pre-ionization pins. The ceramic spoilers can be placed in either of the cathode or anode electrodes, but can advantageously be used in both the cathode and anode electrodes. Due to the flow of gas between the electrodes, the "older" or "discharged" gas will primarily be located on one side of the electrodes in the discharge chamber. Arcing can occur primarily on the side including the older gas, such that a spoiler might be used only on that side of an electrode.

A ceramic spoiler can have a shape such as that seen in the exemplary cross-section of FIG. 3, but typically will follow the general shape that the electrode would have without the spoiler(s). The outer surface of each ceramic spoiler also can have a shape that is optimized to improve the flow of gas between the electrodes. The shape can be smooth in order to minimize turbulence effects, and can be shaped to tangentially follow the flow of gas through the chamber. The smooth, tangential shape allows the gas to flow smoothly over the surface of the spoiler. Any surface roughness, edges, or prominent features on the surface of the electrodes could lead to turbulence in the gas flow, similar to that seen with respect to the nose portion in FIG. 2. The use of spoilers also can allow the height of the nose portion to be minimized, which can further minimize turbulence in the gas flow. The nose portion 306 can be just long enough to achieve proper discharge capability, while limiting the effect on gas flow between the electrodes. Line 308 in the Figure demonstrates a symmetry axis for the electrode, as an exemplary design can use a symmetric approach to the electrode body and ceramic spoilers. This not only can have the advantage of ensuring proper discharge, but can ease and lower the cost of the manufacturing process as only one shape needs to be used for the ceramic spoilers, which can be used with either shoulder of a given electrode. In certain embodiments, spoilers may need to have a different shape for the cathode and the anode, but can have consistent shape within an electrode.

In forming the electrode structure 300, a channel 310 can be formed in the electrode body, such as by a milling process, on each side of the symmetry axis 300. Each channel can allow for insertion of at least a portion of a ceramic spoiler. As shown in FIG. 3, a tongue portion 314 of a spoiler 304 can slide into a channel or groove portion 310 of the electrode body 302. Tongue and groove connections are well known, and any number of variations can be envisioned as are known in the relevant arts. In order to fix the position of the ceramic spoilers in the respective channels, such that a spoiler cannot move laterally within the channel, a fixture or mounting bracket can be placed in the channel that exerts holding pressure on the tongue portion of the spoiler. Other fixtures for holding a tongue in place inside a groove are well known, and variations can be envisioned that would not have a detrimental effect on laser operation. One type of mounting device that can be utilized successfully is a fixing snap-on mounting structure 316.

A diagram of an exemplary snap-on mounting structure 400 is shown in FIG. 4. Snap-on mountings such as those described herein are available from Feuerherdt GmbH, with offices in Berlin, Germany. These snap-on mounting structures, which can include a mounting portion 402 and a clip 404, can function like springs, and are strong enough to hold the ceramic spoiler tongues inside the channels of the electrodes as shown in FIG. 4(b). As seen in FIG. 4(b), and discussed with respect to FIG. 3 for clarity, the mounting portion 402 can be placed in the channel against the electrode body 302. Each clip 402, of which several can be used with each mounting portion, can be snapped into place in one of the connection openings 406 of the mounting. An extending portion of the clip will press against the tongue portion 314 of the spoiler, holding the tongue 314 firmly in place relative to the channel.

One advantage to using snap-on mounting assemblies as shown in FIG. 4 is that no screws are necessary to mount the ceramic spoilers with the electrode body. Such a mounting technique can prevent arcing that could otherwise occur from the screws to the electrodes or preionization unit. The snap-on mountings can be made of a Copper-Beryllium alloy, for example, which can be covered by a nickel layer, such that arcing will not occur from the mountings. Also, no holes have to be drilled into the ceramic spoilers that could potentially influence the flow of gas between the electrodes.

Another advantage is that the snap-on assemblies are not rigidly attached to the spoiler or electrode body. The clips of the mounting assemblies also have a slight lateral flexibility. These aspects of the mounting assembly can be important, as the ceramic spoilers and electrode bodies will typically increase in temperature during laser operation. As an electrode body will typically have a different coefficient of expansion than a ceramic spoiler, undesired stress can occur if a spoiler is rigidly connected to an electrode body. In a worst case scenario, a ceramic spoiler can burst under the stress influence. The use of snap-on mountings can prevent such stress, as the mountings are elastic and allow for some lateral expansion and/or contraction of the spoilers and/or electrode bodies.

Cleaning of Manufactured Electrodes

Before the electrodes are mounted into the discharge chamber, several cleaning procedures can be used to remove lubricants and other substances on the surfaces and in any screw threads of the electrodes as a result of the manufacturing process. These impurities can be removed from the surface to prevent a negative effect on laser operation. Several steps can be required in such a cleaning process. In one such process, the manufactured electrodes are first cleaned in n-pentane (purity 99%), such as is available from Merck KGaA with offices in D-64271 Darmstadt, Germany, in an ultrasonic cleaning device. The electrodes then can be cleaned in acetone (purity 99.5%), such as is available from Merck KGaA with offices in D-64271 Darmstadt, Germany, in an ultrasonic cleaning device. The electrodes then can be cleaned in ethanol (purity 99.8%), such as is available from Merck KGaA with offices in D-64271 Darmstadt/Germany, in an ultrasonic cleaning device. A special cleaning paper called E-Tork can be used to dry the manufactured electrodes after the ultrasonic cleaning.

After drying the ultrasonically-cleaned electrodes, an excimer laser can be used to further clean the electrodes. A setup 500 for such a process is shown in FIG. 5. An excimer laser 502, such as an ArF laser, can be used to clean a manufactured electrode 504. A laser beam emitted from the excimer laser 502 can be directed toward the electrode 504 using an appropriate optical arrangement, such as may include a moveable or deformable mirror 506 and a focusing lens 508. The beam path 510 can be purged by an inert gas, nitrogen gas, or argon gas in order to avoid absorption by contaminants (e.g. oxygen) that can be present in common air. A stream 512 of argon purge gas can be directed near the surface of the electrode, toward the area on the electrode where the UV radiation is being used to clean the electrode surface. In this way, impurities and debris can be removed from the vicinity of the surface of the electrode 504. The electrode can be mounted on a stage (not shown), which can allow for continuous movement of the electrode relative to the excimer beam, in order to clean the entire length of the electrode. The rate of movement of the electrode can be any appropriate rate, such as on the order of about 2 mm/s.

Improved Blower Bearings

Experiments have shown that the size of a typical blower used in lasers at the 1–4 kHz range is not sufficient to reach the high gas speeds needed between the electrodes, such as on the order of about 30–50 m/s. One way to achieve these gas speeds is to use a blower having a diameter that is larger than the diameter of a typical blower. Such a blower can revolve with 4000–6000 RPM in order to clear the gas from the discharge region between pulses. The general construction of one such blower having a smaller diameter is described in U.S. Provisional Patent Application No. 60/193,048, filed Mar. 29, 2000, and pending U.S. patent application Ser. No. 09/823,298, filed Mar. 29, 2001, each having a common assignee with the present application, and which are incorporated by reference in their entirety above.

Another approach that can be used to obtain the desired performance from blowers for these high repetition rate lasers is to utilize improved blower bearings. These improved bearings can be made of a high nitrogen-alloyed martensitic steel, such as CRONIDUR®. CRONIDUR® is a trademark of, and is available from, FAG Kugelfischer AG, CH-8153 Rümlang, Switzerland. CRONIDUR® was developed for applications in the areas of aviation and astronautics. A specific type of CRONIDUR® presently known and used in the industry is Cronidur 30. This new bearing steel provides improvement in corrosion resistance of about a 100 times that of conventional steel AISI 440C. The lifetime of the CRONIDUR® bearings is also about 5 times higher than for steel M50. This combination gives the steel a high firmness and good toughness with outstanding corrosion resistance.

These improved bearings also can be advantageous when low lubrication is used, or when different materials are used in the bearings. As mentioned, the corrosion is much lower than that of other well known steels. The increase in life-time of the bearings can reduce the service times for the laser, such that the throughput for industrial applications is increased. Such a bearing can consist of a ball bearing or cylindrical roller. Other bearing materials, such as ceramics, can also be used for the blower bearings. An advantage to using ceramic balls or ceramic cylindrical rollers is that no lubrication is necessary. Such bearings can have a lifetime that is substantially increased with respect to ordinary blower bearings. The increased lifetime can also significantly reduce vibrations that otherwise can be caused by worn out bearings in the blower. Preventing wearing on the bearings can help to maintain the configurational accuracy of outer races, inner races, shaft elements, and rolling elements of the blower, all of which can contribute to blower vibration. It can be advantageous to reduce the size and frequency of the vibrations, as vibrations can influence wavelength and energy stability, as well as bandwidth.

Advanced Lubricant

Additional friction reduction in the blower can be obtained using one of a new class of dry lubricants. Specific data for one such lubricant, DICRONITE®, is listed in Table 1 contained in FIG. 6. DICRONITE® is a trademark of, and is available from, Dicronite Dry Lube, having offices around the world such as at Dicronite Dry Lube Germany, 58644 Iserlohn, Germany. One specific DICRONITE® lubrication that can be used advantageously is a DL-5 modified tungsten disulfide, which can reduce friction in bearing components to never before seen levels. Such dry lubrication can avoid wear, reduce energy conversion in warmth, and make lubrication possible without contamination. To enable a physical bonding of the dry film lubrication, the surface of the bearings or inners surface of the blower to be coated can be pretreated until an oxide and impurity free atomic structure is obtained. With a DICRONITE® procedure, a dry film lubrication can be produced that is an even 0.5 µm thick. The coating can become a part of these surfaces, such that the coating can be removed only if a portion of the material itself is removed. The film can prevent the direct contact of the material surfaces and, therefore, work like an oil film. Moreover, the layer can have an extremely low coefficient of friction of µ=0.030, or less than half that of graphite where µ=0.073. This low coefficient of friction can help to minimize frictional effects, heating, and wear on parts of the blower. The gas life-time can also be increased, as the lubricant does not reacting with the laser gas. A further result of using such treated bearings is that dust in the laser chamber can be reduced, as abrasion in the bearing is minimized. The reduction of dust can help to prolong the life-time of the laser windows, and minimize time lost to service downtime.

Radially Displaced Shoulder Regions

Figure 7:
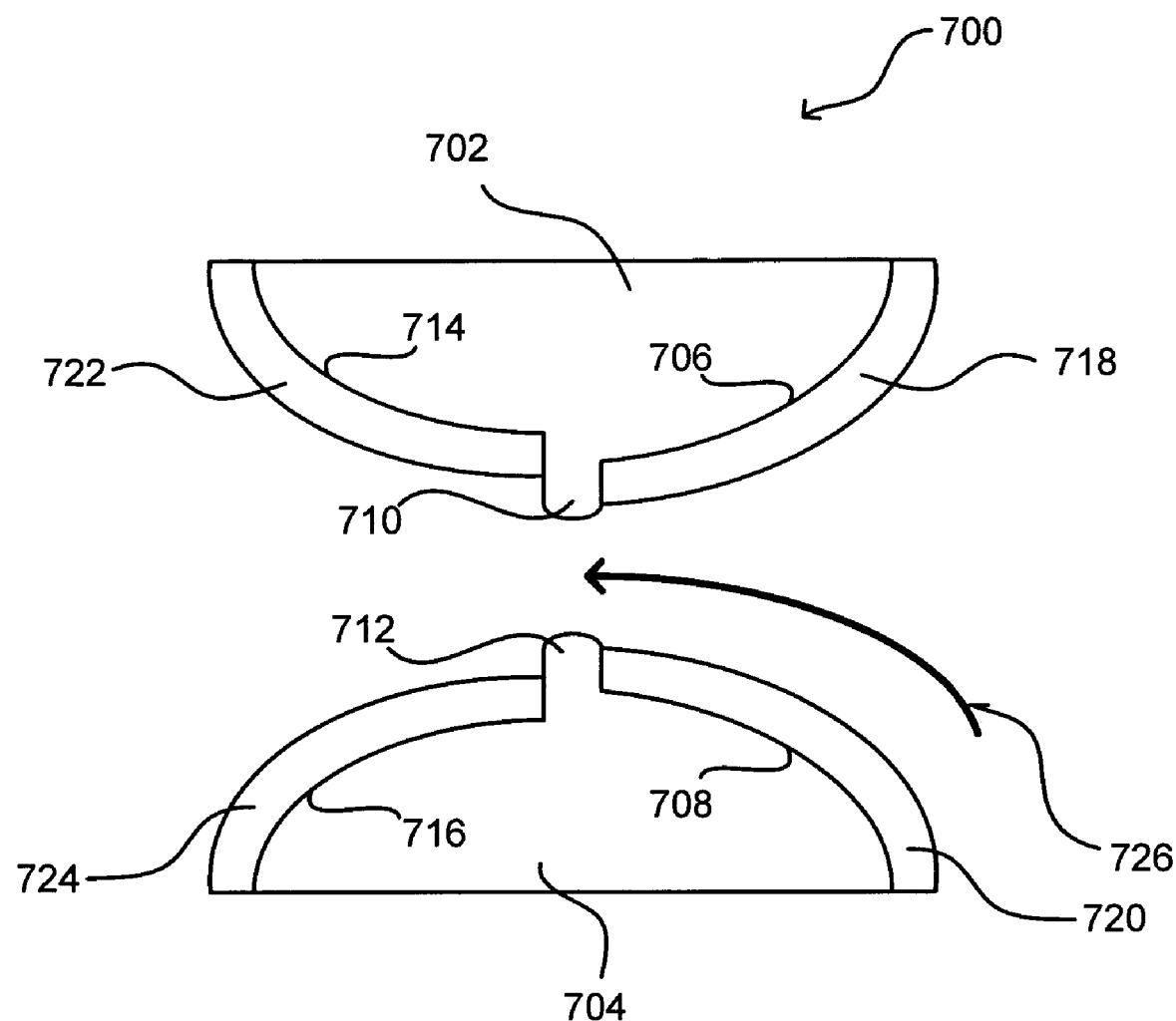
FIG. 7 is a schematic diagram of opposing electrodes having ceramic spoilers in accordance with another embodiment of the present invention.

FIG. 7 shows a schematic view of another electrode configuration 700 that can be used in accordance with embodiments of the present invention. For simplicity, the mechanisms for mounting the insulating spoilers to the electrodes are omitted from the Figure. It should be understood, however, that any appropriate mounting procedure such as those described elsewhere herein can be used to connect the insulating spoilers to the electrodes. In the Figure, electrode bodies 702 and 704 are provided which are similar to the electrode body described in connection with FIGS. 2(a)–2(c). Electrode bodies 702 and 704 differ, however, in that each electrode body has a first shoulder region 706, 708 that is raised, or displaced radially, with respect to a respective second shoulder region 714, 716. The raised shoulder regions 706, 708 can be placed on the side of the oncoming gas flow 726. Using a raised shoulder region on the side of the oncoming gas flow reduces the amount of the nose portion 710, 712 of each electrode body that extends out into the gas flow, thereby reducing the potential for turbulence being introduced into the gas flow by the nose portions 710, 712. Using a lower shoulder portion 714, 716 serves to distance those portions of the electrode bodies from each other, to further prevent the likelihood of arcing. The use of lower shoulder portions also reduces the amount of material necessary to manufacture the electrode bodies, thereby reducing manufacture costs.

An insulating spoiler 718, 720, 722, 724 can be used to insulate each shoulder region as described elsewhere herein. Here, each spoiler can have a common thickness. Alternatively, the spoilers 718, 720 on the side of the oncoming gas flow can be somewhat thicker, to further reduce the effective nose portion extending into the gas flow. In some embodiments, the shoulder regions of the electrode bodies are not raised with respect to each other, but the thickness of the spoilers varies in order to reduce the intrusion of the nose portion into the gas flow. For example, shoulder regions 708 and 716 of electrode body 704 could be at approximately the same radial height, but spoiler 720 could be significantly thicker than spoiler 724, such that the effective position of the outer edge of spoiler 720 is the same as that shown in FIG. 7 for raised shoulder portion 708.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. An excimer or molecular fluorine laser system, comprising:
   a resonator including therein a discharge chamber filled with a gas mixture, the discharge chamber including at least one window at an end of the discharge chamber for sealing the discharge chamber and for transmitting a laser pulse;
   a pair of elongated discharge electrodes in the discharge chamber and connected to a discharge circuit for energizing the gas mixture and generating the laser pulse, each discharge electrode including a conductive structure that is exposed to the gas mixture in order to impart electrical energy to the gas mixture and generate the laser pulse, with at least one of the electrodes including an elongated channel having an internal width greater than the width of the opening to the channel;

a elongated ceramic spoiler, said spoiler including a projecting tongue, wherein at least portion of the free end of the tongue has a width larger than the width of the tongue at a point closer to the spoiler, said tongue being received in the channel of the electrode;

a spring mounted in the channel and biasing the tongue of the spoiler against the sides of the channel so that the spoiler is held in a stationary position with respect to the electrode body; and a blower for circulating the gas mixture between the pair of discharge electrodes.

2. A laser system according to claim 1, further comprising:

at least one pre-ionization unit including a plurality of pre-ionization pins positioned in said discharge chamber and capable of energizing the gas mixture, and wherein the insulating member prevents arcing between the second surface region and the pre-ionization pins.

3. A laser system according to claim 1, wherein:

said conductive structure of at least one of said electrodes includes a protruding nose portion capable of maintaining an appropriate gap distance between the pair of discharge electrodes.

4. A laser system according to claim 1, further comprising:

at least two bearings for supporting said blower.

5. A laser system according to claim 4, wherein:
said bearings are made of a Cronidur material.

6. A laser system according to claim 4, wherein:
said bearings are made of a high nitrogen-alloyed martensitic steel.

7. A laser system according to claim 4, further comprising:

a dry film lubricant for lubricating said at least two bearings supporting said blower.

8. A laser system according to claim 7, wherein:
the dry film lubricant is a modified tungsten disulfide.

9. A laser system according to claim 7, wherein:
the dry film lubricant is a Dicronite lubricant.

10. A laser system according to claim 4, wherein:
said at least two bearings are selected from the group consisting of ceramic ball bearings and ceramic roller bearings.

11. A laser system as recited in claim 1, wherein said channel includes tapered sidewalls so that the separation between the sidewalls is narrower near the opening of the channel and wherein said tongue of the spoiler includes tapered side walls so that the width of the tongue increases outwardly from the spoiler.

12. An electrode structure for a gas discharge laser, comprising:

an elongated electrode body capable of functioning as one of an anode and a cathode in order to energize a gas mixture in the discharge chamber, the electrode body including a shoulder portion, said shoulder including an elongated channel having an internal width greater than the width of the opening to the channel;

a elongated ceramic spoiler coupled with the shoulder portion of said electrode body, said spoiler including a projecting tongue, wherein at least portion of the free end of the tongue has a width larger than the width of the tongue at a point closer to the spoiler, said tongue being received in the channel of the electrode body; and a spring mounted in the channel and biasing the tongue of the spoiler against the sides of the channel so that the spoiler is held in a stationary position with respect to the electrode body.

13. An electrode structure according to claim 12, wherein:
the electrode body further includes a nose portion for energizing the gas mixture, the shoulder portion being positioned on either side of the nose portion.

14. An electrode structure according to claim 12, wherein:
at least a portion of the ceramic spoiler exposed to the gas mixture is shaped to tangentially follow a flow of gas mixture through the discharge chamber.

15. An electrode structure according to claim 12, wherein spring is made of a Copper-Beryllium alloy and covered by a nickel layer.

16. An electrode structure for a gas discharge laser, comprising:

an elongated electrode body capable of functioning as one of an anode and a cathode in order to energize a gas mixture in the discharge chamber, the electrode body including a shoulder portion, said shoulder including an elongated channel having tapered sidewalls so that the separation between the sidewalls is narrower near the opening of the channel;

a elongated ceramic spoiler coupled with the shoulder portion of said electrode body, said spoiler including a projecting tongue having tapered side walls so that the width of the tongue increases outwardly from the spoiler, said tongue being received in the channel of the electrode body; and a spring mounted in the channel and biasing the tongue of the spoiler against the walls of the channel so that the spoiler is held in a stationary position with respect to the electrode body.

17. An electrode structure according to claim 16, wherein:
the electrode body further includes a nose portion for energizing the gas mixture, the shoulder portion being positioned on either side of the nose portion.

18. An electrode structure according to claim 16, wherein:
at least a portion of the ceramic spoiler exposed to the gas mixture is shaped to tangentially follow a flow of gas mixture through the discharge chamber.

19. An electrode structure according to claim 16, wherein spring is made of a Copper-Beryllium alloy and covered by a nickel layer.

* * * * *